United States Patent [19]

Katsuno

[11] Patent Number: 4,999,801

[45] Date of Patent: Mar. 12, 1991

[54] FLOATING POINT OPERATION UNIT IN DIVISION AND SQUARE ROOT OPERATIONS

[75] Inventor: Akira Katsuno, Ebina, Japan

[73] Assignee: Fujitsu Limited, Kawasaki, Japan

[21] Appl. No.: 374,299

[22] Filed: Jun. 30, 1989

[30] Foreign Application Priority Data

Jul. 15, 1988 [JP] Japan ............................... 63-174872
Aug. 15, 1988 [JP] Japan ............................... 63-201891

[51] Int. Cl.$^5$ .............................................. G06F 7/38
[52] U.S. Cl. .................................................. 364/748
[58] Field of Search ............... 364/748, 752, 765, 754, 364/761

[56] References Cited

U.S. PATENT DOCUMENTS 4,607,343  8/1986  Chevillat et al. .................... 364/752
4,707,798  11/1987  Nakano .............................. 364/765

OTHER PUBLICATIONS

"WTL 1032/1033 Floating Point Division/Square Root/IEEE Arithmetic", *WEITEK* Preliminary Release Application Note.

*Primary Examiner*—Dale M. Shaw
*Assistant Examiner*—Long T. Nguyen
*Attorney, Agent, or Firm*—Staas & Halsey

[57] ABSTRACT

A floating point operation unit comprises an exponent operation circuit, a sign operation circuit and a mantissa operation circuit. The mantissa operation circuit comprises a fixed point multiplier, a first right shifter, an incrementer, a rounding off controller, a second right shifter, and further, an inversion circuit between the first right shifter and the incrementer. By controlling the inversion circuit and the rounding off controler when one operation of an iterative approximation in a division or a square root operation is executed, the number of cycles in the above operation is reduced, and as a result, the operating speed is increased.

4 Claims, 4 Drawing Sheets

FLOATING POINT OPERATION UNIT IN DIVISION AND SQUARE ROOT OPERATIONS

BACKGROUND OF THE INVENTION

1. Field of the Invention

The present invention relates to a floating point operation unit, and more particularly, relates to an operation unit for executing division or square root operations on numerical values expressed by a floating point notation.

2. Description of the Related Art

An operation using a floating point notation provides a wide dynamic range and a high accuracy, and therefore, the floating point operation is currently used to enable various high grade operations, and particularly, a high speed processing of division and square root operations.

In conventional division operations two methods are used: subtraction and shift, and a converging method, for example, the Newton-Raphson method. In the former method, the shifted divisor is repeatedly subtracted from a dividend; an example of this is the non-restoring method, and in an improved non-restoring method a quotient can be obtained at a high speed. In the latter method, a reciprocal of the divisor is calculated by a converging method and the reciprocal is multiplied by the dividend to obtain the quotient. In this method, the number of operation cycles needed to realize a convergence is reduced due to a close similarity of the initial assumed reciprocal value to a true value.

The converging method (e.g., Newton-Raphson method) is also used for a square root operation. In this method, to obtain a square root of a number B, first $1/\sqrt{B}$ is obtained, the obtained value is multiplied by B, and $\sqrt{B}$ is obtained. When the calculation of $1/\sqrt{B}$ is executed by the Newton-Raphson method, the number of cycles is reduced due to the close similarity of the initial assumed reciprocal value to a true value.

Many of the known floating point operation units utilize the Newton-Raphson method because, in the other methods, the quotient obtained by one cycle is at most 3 to 4 bits, and to obtain the final quotient, the calculations must be repeated for eight cycles in an IEEE single-precision standard. Conversely, in the Newton-Raphson method, if the initial value of the reciprocal can be given within a certain limit, the quotient is obtained by a converging calculation of about 3 to 4 cycles, and accordingly, in the dividing operation using the Newton-Raphson method, the quotient can be obtained at a higher speed than with the other methods. Many units also utilize the Newton-Raphson method for the square root operation, since in this method, if the initial reciprocal value is given within a certain limit, a converging calculation of about 3 to 4 cycles is sufficient, and accordingly, the square root operation by the Newton-Raphson method can be processed at a high speed.

The division operation using the Newton-Raphson method is explained below.

First, when the division is executed, a reciprocal function is calculated. For example, the division $C=A/B$ is expressed as $C=A(1/B)$ using a reciprocal form. The reciprocal function $(1/B)$ is expressed by the Newton-Raphson method as follows.

$$X_{i+1} = X_i(2 - BX_i)$$

Where, $i=0, 1, 2, \ldots$, $X_0$ is the initial reciprocal of a divisor corresponding to $i=0$, and $X_i$ expresses an ith approximation of $(1/B)$. If the initial value $X_0$ satisfies the following inequality, $(2/B) > |X_0| > 0$, the operation is completed. In a typical method of obtaining the initial value, approximately the upper 10 bits of the divisor are used as a pointer of a memory (ROM) in a look up table. The ROM outputs the initial value in response to an address pointed out by bits of the divisor. Usually, the bit number of an output (bit number of $X_0$) is approximately the same as the bit number of an input (approximately upper 10 bits of the divisor). In the case of the division in the floating point operation, the reciprocal of an exponent portion and a mantissa portion are obtained from individual look up tables (ROM).

The conventional division process is explained below.

First, two binary data A and B are expressed by the floating point notation, as follows, $$A = (-1)^{Sa} 2^{Ea-BS}(1 \cdot Fa)$$

$$B = (-1)^{Sb} 2^{Eb-BS}(1 \cdot Fb)$$

and the following operations are executed. The mantissas $(1 \cdot Fa)$ and $(1 \cdot Fb)$ of the input data A and B, respectively are multiplied by each other through a fixed point multiplication circuit, and the result $(1 \cdot Fa) \times (1 \cdot Fb)$ is obtained. Namely, the result is 1.xxxx ... or 1x.xxxx .., and although 1.xxxx ... is already normalized, 1x.xxxx ... still remains to be normalized. This normalization is executed by shifting the data to the right by one bit and by increasing the exponent portion by one in response to an overflow signal. Then, the normalized value is rounded off to match the output data form. If the bits are all "1", an overflow occurs, and in this case the data is shifted by one bit to the right. The above processes provide a final output which is the normalized number.

In the exponent portion, the operation of (Ea+Eb) is executed and the result is added to a negative bias (−BS); i.e., (Ea+Eb−BS) is obtained. Then, when the overflow must be corrected by normalization, the mantissa value is incremented by one. For a correction of the overflow by rounding off, the increment by one is previously executed.

The operation in the sign operation portion is performed by an exclusive OR circuit.

When the division operation is carried out using the above conventional floating point operation unit, the binary calculation of $(2 - BX_i)$ necessary in the division using the converging method cannot be executed in one step. Namely, to calculate the repeating calculation executed when the reciprocal of the divisor is obtained by the converging method, i.e., $X_{i+1} = X_i(2 - BX_i)$, the multiplication $BX_i$, the subtraction $(2 - BX_i)$ and the multiplication $X_i(2 - BX_i)$ are necessary. Therefore, the total processing time is prolonged and it becomes difficult to realize a high speed operation.

Further, an addition or subtraction circuit must be added to execute the subtraction in $(2 - BX_i)$. Assuming that the above $X_{i+1} = X_i(2 - BX_i)$ is performed by an addition of the above circuit, still three arithmetic operations must be repeated, and thus no improvement is obtained from the view point of a high speed operation of the floating point division process.

The square root operation using the Newton-Raphson method is explained. When the square root operation is carried out, first a reciprocal function is calculated, for example, $C=\sqrt{B}$ is expressed as $C=B(1/\sqrt{B})$. The repeat expression of the Newton-Raphson method is as follows.

$$X_{i+1}=(\tfrac{1}{2})*X_i(3-BX_i^2)$$

Where $X_0$ corresponding to $i=0$ is an approximate value of the initial reciprocal of $\sqrt{B}$, $X_i$ is an ith approximation value, and the asterisk indicates multiplication. If the initial value $X_0$ satisfies the inequality $0<X_0<\sqrt{3/B}$, the operation is completed. In a typical method of obtaining the initial value, the approximately upper 10 bits of B are applied to a look up table (ROM) as a pointer, and the ROM outputs the initial value from the memory addressed by the value of B. Usually, the output bit number is approximately the same as the input bit number. Generally, in the square root operation by the floating point operation, the reciprocals of the exponent and the mantissa are stored in individual look up tables.

In the square root operation, repeated calculations of $X_{i+1}=(\tfrac{1}{2})*X_i(3-BX_i^2)$ must be made for carrying out the following five arithmetic operations.

MLT: $B*X_i$ (hereinafter $B*X_i=A$)
MLT: $A*X_i$
SUB: $3-(A*X_i)$
MLT: $X_i*(3-(A*X_i))$
MLT: $(\tfrac{1}{2})*(X_i*(X_i*(3-(A*X_i))))$ Where MLT: multiplication, SUB: subtraction. Accordingly, the total operation time is prolonged and it becomes difficult to execute a high speed operation.

SUMMARY OF THE INVENTION

An object of the present invention is to provide a floating point operation unit wherein a repeating calculation can be carried out at a high speed when a reciprocal of an operand is obtained using a converging method, whereby high speed processing of the floating point operation can be realized.

Another object of the present invention is to realize high speed processing by a simple improvement in the floating point operation unit.

In the present invention there is provided a floating point operation unit comprising an exponent operation means for operating on exponents from two inputs to be operated, a sign operation means for operating on signs from the two inputs, and a mantissa operation means for operating on mantissas from the two inputs; the mantissa operation means comprising a fixed point multiplication means for multiplying one of the mantissas with another of the mantissas; a first right shift means receiving an output of the fixed point multiplication means for normalizing the output; an incrementer means receiving an output of the first right shift means; a rounding off control means receiving the output of the first right shift means, and for supplying the output thereof to the incrementer means; a second right shift means receiving a carry signal of the incrementer means, and for shifting the output of the incrementer means to the right when the carry signal is supplied; and an inversion means receiving the output of the first right shift means for selectively supplying an inverting output to the incrementer means instead of the output of the first right shift means when one operation of an iterative approximation in a division or a square root operation is executed; the incrementer means being supplied with the increment signal when the respective one operation of the iterative approximation is executed; the second right shift means shifting the output of the incrementer means to the right when the one operation of the iterative approximation of the square root operation is executed.

Other features and advantages of the invention will be apparent from the following description given with reference to the accompanying drawings.

DESCRIPTION OF THE PREFERRED EMBODIMENTS

Figure 1:
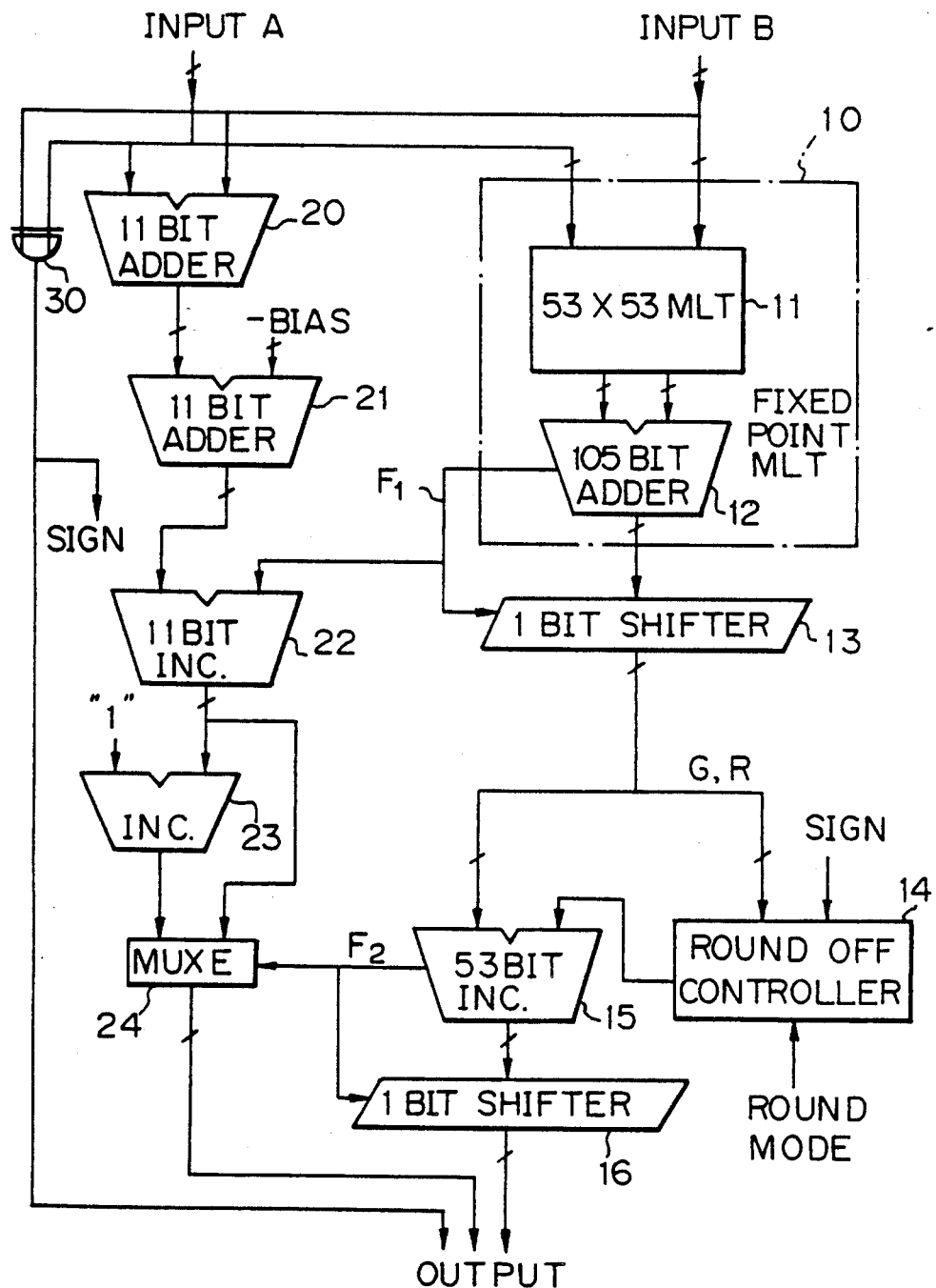
FIG. 1 is a circuit diagram showing a conventional example of a floating point operation unit.

Prior to the description of the preferred embodiments, a conventional floating point operation unit is explained with reference to FIG. 1.

The unit comprises an exponent operation circuit, a sign operation circuit, and a mantissa operation circuit; the exponent operation circuit comprises adders 20 and 21, incrementers ("INC.") 22 and 23, and a multiplexer ("MUKE") 24; the sign operation circuit comprises an exclusive OR circuit 30; and the mantissa operation circuit comprises a fixed point operation circuit (or multiplication "MLT" circuit) 10, right shifters 13 and 16, a rounding off controller 14, and an incrementer 15.

Assuming that exponents of the inputs A and B are Ea and Eb, the operation of (Ea+Eb) is executed in the first adder 20, and the above result is added in the second adder 21 to a negative bias (−BS). Namely, the operations of (Ea+Eb−BS) are executed by the two adders 20 and 21. Then, in the incrementer 22, the increment operation by one (+1) is executed when a correction of an overflow is necessary for normalization, and in the incrementer 23, the incrementer operation (+1) is previously executed to correct any overflow due to the rounding off process, and one of the signals is selected by the multiplexer 24 corresponding to an overflow signal $F_2$.

In the sign operation circuit (30) the exclusive OR operation is carried out, using the exclusive OR circuit 30, for the signs, i.e., Sa and Sb, corresponding to the inputs A and B.

In the mantissa operation circuit, a mantissa (1·Fa) is multiplied with another mantissa (1·Fb) through the fixed point multiplication circuit 10, which mantissas are the respective mantissa portions of the inputs A and B to be processed, and as a result, if a carry $F_1$ is output, the normalization is carried out by a one bit right shift through the right shifter 13. The carry $F_1$ simultaneously is supplied to the incrementer 22 and "+1" is added to the exponent. The normalized result is controlled by the rounding off controller 14 and the rounding off process is performed in the incrementer 15 by adding "+1" to the LSB (least significant bit) when necessary. When an overflow arises in the incrementer 15, the carry $F_2$ is output and the right shifter 16 shifts the output of the incrementer 15 by one bit to the right, and thus the normalized mantissa is obtained.

The division process executed in the unit according to the present invention is explained below.

Figure 2:
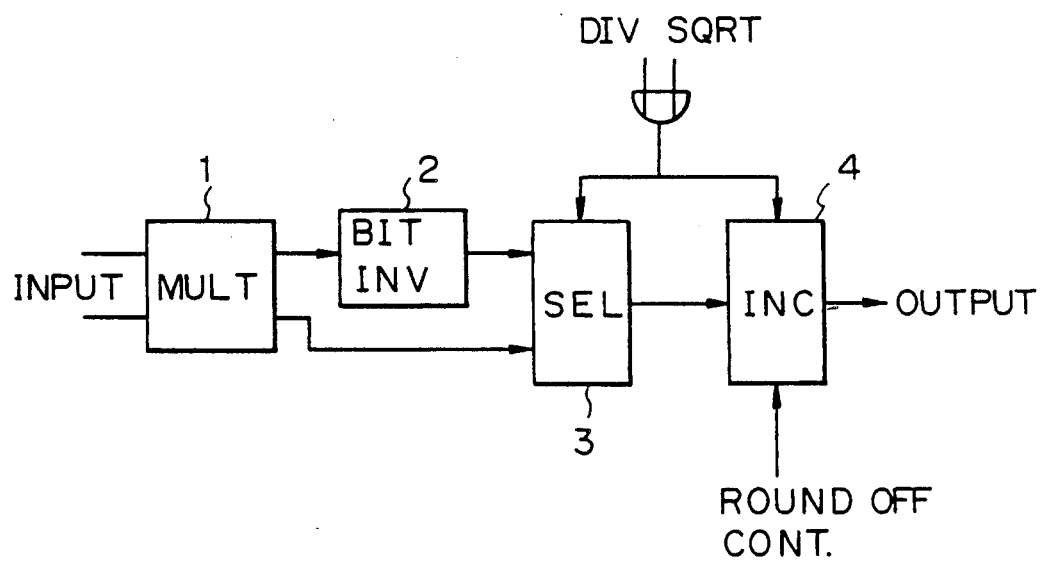
FIG. 2 is a summarized block diagram explaining the present invention.

As shown in FIG. 2, which is a summarized block diagram, the unit comprises a multiplying ("MULT") circuit 1 for multiplying mantissa portions by each other, which mantissa portions are expressed by the floating point notation and included in the two binary data inputs, and for normalizing the output; a bit inversion ("BITINV") circuit 2 for inverting the output data from the multiplying circuit 1; a selection ("SEL") circuit 3 for selecting the output of the bit inversion circuit 2 or the output of the multiplying circuit 1 in response to a control signal (division or square root) which is active upon in correspondence with performing one of the division or square root process operations respectively; and an increment ("INC.") circuit 4 for executing a rounding off process of the output of the multiplying circuit 1 in response to a predetermined rounding off control signal when the multiplying circuit output is selected in the selection circuit 3, for adding "+1" to the LSB of the output of the inversion circuit 2 in response to the control signal (division or square root) when the output of the bit inversion circuit is selected in the selection circuit 3, and for normalizing the above-obtained respective values.

The division operation processes are as follows. First the operation of $(2-BX_i)$ is executed using the multiplying circuit 1, the bit inversion circuit 2, and the incrementer 4: where $(2-BX_i)$ is necessary when the floating point division operation A/B is carried out using the converging method, $0 < BX_i \leq 1$, (i=0, 1, ...), $X_0$ is an initial value of the reciprocal of the divisor, and $X_i$ is an ith approximation value of the reciprocal of the divisor. Then, the operation $X_{i+1} = X_i(2-BX_i)$, which gives an approximation value of the reciprocal of the divisor, is executed through the multiplying circuit, and the division of A/B is carried out by applying the data of $X_{i+1}$ obtained by repeating the respective calculations for a predetermined number of times, and the data A is the dividend.

The square root operation of the mantissa portion of the normalized number $(1 \leq B < 2)$ expressed by the floating point data format according to the IEEE standard now is explained. Assuming that the square root value is C: $C = \sqrt{B} = B(1/\sqrt{B})$, then the approximate value $X_{i+1}$ of $1/\sqrt{B}$ is expressed as follows: $X_{i+1} = (\frac{1}{2})*X_i(3-BX_i^2)$; where $0 < X_0 \leq \sqrt{3/B}$, $B > 0$, and $X_0$ is an initial value.

If $0 < X_0 \leq \sqrt{1/B}$ from a look up table (ROM), and $0 < AX_0 \leq 1$, where $A = BX_0$ and therefore, $2 \leq (3-AX_0) < 3$, $1 \leq (\frac{1}{2})*(3-AX_0) < 3/2$, and $(\frac{1}{2})*(3-AX_i)$ is the normalized number. Accordingly, $(\frac{1}{2})*(3-AX_0)$ generally becomes a normalized number.

The operation of $(\frac{1}{2})*(3-AX_i)$ now is explained. Since $0 < AX_i \leq 1$, if $\overline{AX_i}$ is the inverted value for below point of $AX_i$, $(3-AX_i)d = (10 \cdot \overline{AX_i} = LSD(1))b$, at this point, LSD(1) shows an addition of "1" to the LSB, ( )d shows a decimal notation, and ( )b shows a binary notation. Further, the thus obtained $(10 \cdot \overline{AX_i} + LSB(1))b$ is shifted to the right by one bit, and $(\frac{1}{2})*(3-AX_i)$, which is a necessary operation in the Newton-Raphson method square root operation, where $0 < AX_i \leq 1$.

Using the above process, the five times repeated operation is simplified as shown below.
MLT: $B*X_i$ (hereinafter $B*X_i = A$)
Above operation: $(\frac{1}{2})*(3-A*X_i)$
MLT: $X_i*(\frac{1}{2})*(3-A*X_i)$
Namely, the above processes are executed by only three arithmetic operations.

Figure 3:
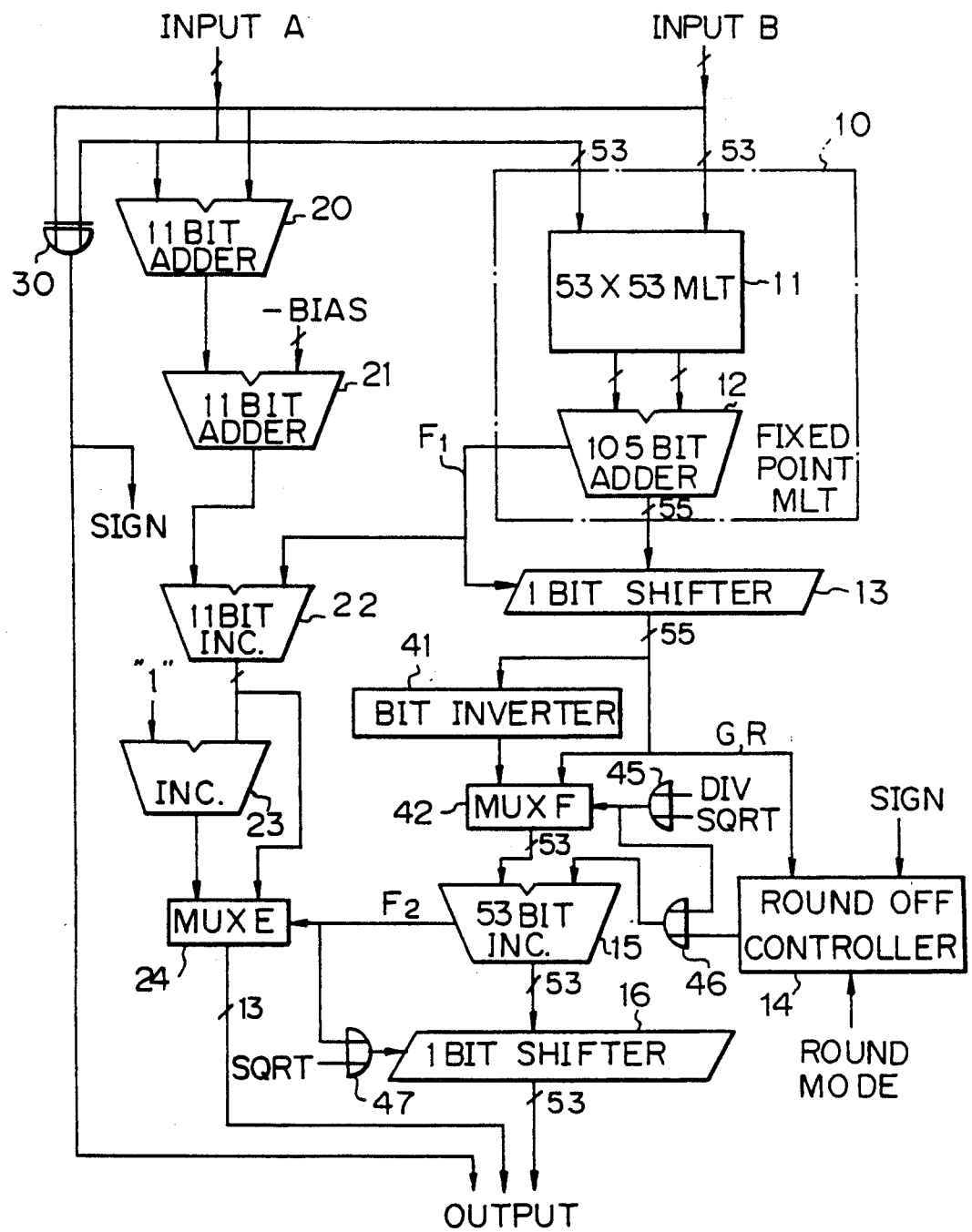
FIG. 3 is a circuit diagram showing a floating point operation unit according to an embodiment of the present invention.

FIG. 3 shows a main constitution of the floating point operation unit according to an embodiment of the present invention. This unit handles only normalized numbers conforming to the IEEE standard.

The unit comprises an exponent operation circuit, a sign operation circuit, and a mantissa operation circuit. The exponent operation circuit comprises adders 20 and 21, incrementers 22 and 23, and a multiplexer 24; the sign operation circuit comprises an exclusive OR circuit 30; and the mantissa operation circuit comprises a fixed point multiplier 10, a one bit shifter 13 as a first right shift means, a rounding off controller 14, a 53 bit incrementer 15, a one bit shifter 16 as a second right shifter, a bit inverter 41 as an inversion means, a multiplexer (MUXF) 42, and OR circuits 45, 46 and 47.

The feature of the constitution of this embodiment is the provision of the bit inverter 41 and the multiplexer 42. The inverter 41 is located between the shifter 13 and the incrementer 15 in the mantissa operation circuit and inverts each bit of the output from the shifter, and the multiplexer 42 selects either the output of the inverter 41 or the output of the shifter in response to the control signal (division or square root). In the case of a division process, a division control signal DIV is at a high (H) level when the operation of $(2-BX_i)$ is executed and the output of the inverter 41 is selected, and in the case of a square root process, a square root control signal SQRT is at H level when the operation of $(\frac{1}{2})*(3-A*X_i)$ is executed and the output of the inverter 41 is selected in the multiplexer 42. In the case of the ordinal multiplication operation, the control signals DIV and SQRT are at a low (L) level and the output of the shifter 13 is selected.

It is assumed that the two inputs of binary data $D_1$ and $D_2$ expressed by the floating point notation are as follows:

$D_1 = (-1)^{Sa} 2^{Ea-BS} (1 \cdot Fa)$ $D_2 = (-1)^{Sb} 2^{Eb-BS} (1 \cdot Fb)$ First, in the mantissa operation circuit, the fixed point multiplier multiplies the mantissa portions (1·Fa) and (1·Fb) with each other as a fixed point. The (1·Fa) and (1·Fb) are mantissas for the two inputs (A, B) data $D_1$ and $D_2$. The fixed point multiplier 10 comprises a partial products generation and addition circuit 11 and an adder 12.

The shifter 13 generates data shifted in the output of the adder 12 by one bit to the right (to the LSB side), and selects either the generated data or the output data from the adder 12 in response to an overflow signal $F_1$ generated by the adder 12. In this embodiment, when the signal $F_1$ is output, the shifted data is selected.

The rounding off controller 14 operates at the ordinal multiplication process. The rounding off controller 14 receives the sign data and a predetermined round mode signal, omits the figures below the LSB (rounding off process), determines whether or not "1" is added to the LSB, and outputs a rounding off control signal to start the above determination.

The incrementer 15, in the case of a usual multiplication process, adds "1" to the LSB of the output data of the multiplexer 42 (i.e., output of shifter 13) in response to the rounding off control signal from the rounding off controller 14. The incrementer 15, in the case of a division or square root process, adds "1" to the LSB of the output data of the multiplexer 42 (i.e., output of inverter 41) in response to the control signal DIV or SQRT. In this case, if the added result data is not normalized, the overflow signal $F_2$ is output.

The shifter 16, as in the shifter 13, shifts the output data of the incrementer 15 by one bit to the right (to the LSB side) when the overflow signal $F_2$ or the signal SQRT is output, and outputs the data as is when the signal $F_2$ or SQRT is not output. The output data is a mantissa of the operated output data.

In the exponent operation circuit, the adder 20 adds the data Ea and Eb, which are the exponent portions corresponding to the exponents of the data $D_1$ and $D_2$, and the adder 21 adds the temporary exponent (Ea+Eb), which is an output of the adder 20, to a predetermined negative bias (−BS). The incrementer 22 adds "1" by the signal $F_1$ to the true exponent (Ea+Eb−BS), which is an output of the adder 21; the incrementer 24 adds "1", to correct the overflow by a rounding off process, to the output data of the incrementer 22; and the multiplexer 24 selects the output of the incrementer 22 or the output of the incrementer 23 in response to the overflow signal $F_2$. The multiplexer 24 selects the output of the incrementer 23 when the signal $F_2$ is output, and selects the output of the incrementer 22 when the signal $F_2$ is not output. The selected data is an exponent portion of the operated output data.

In the sign operation circuit, the exclusive OR circuit 30 receives sign data Sa and Sb corresponding to the input data $D_1$ and $D_2$ and outputs the sign data. The sign data becomes "0" (positive) when signs of the input data $D_1$ and $D_2$ are the same, and becomes "1" (negative) when the signs are different. The sign data is supplied to the rounding off controller 14 and is the sign of the operated output data.

The division process conforming to the IEEE standard is explained in detail below. The applied division is C=A/B=A(1/B), and in this equation, all the numbers A, B, and C are normalized numbers. In the above condition, an (i+1)th approximation is obtained of the reciprocal function 1/B, $X_{i+1}=X_i(2-BX_i)$; where $0<X_0<2/B$ when B>0, and $0>X_0>2/B$ when B<0.

The initial value $X_0$ is set as shown below: $0<X_0 \leq 1/B$ using a look up table (not shown). Then, $0<BX_0 \leq 1$, therefore, $1 \leq 2-BX_0 2$. Here $(2-BX_0)$ is a normalized number, and thus, generally, $(2-BX_i)$ is a normalized number.

The operation of $(2-BX_i)$, where $0<BX_i \leq 1$, is executed as shown below. If the inverted value of $BX_i$ is $\overline{BX}_i$, $2-BX_i=1 \cdot \overline{BX}_i+LSB(1)$. At this point, LSB(1) means the addition "+1" to LSB.

First the exponent operation circuit and the sign operation circuit are disabled, then the data of the divisor B and the initial value $X_0$ of the reciprocal of the divisor are supplied to the multiplier 10 as input data $D_1$ and $D_2$, and the control signal DIV is set to H level. The output $BX_0$ of the multiplier 10 is supplied to the inverter 41 through shifter 13, and the data of each bit are inverted ($\overline{BX}_0$), selected by the multiplexer 42, and supplied to the incrementer 15. The incrementer 15 adds "1" to the LSB of the input data ($\overline{BX}_0$) in response to the H level signal DIV, and the added data ($\overline{BX}_0+LSB(1)$), i.e., $(2-BX_0)$, is normalized through the shifter 16 and output as normalized data $D_3$ (step 1).

Then, the output data $(2-BX_0)$ and the initial value $X_0$ are supplied to the multiplier 10 as data $D_1$ and $D_2$, and the control signal DIV is set to L level, and the output of the multiplier 10, $X_0(2-BX_0)$ is supplied to the incrementer 15 through the shifter 13 and selected by the multiplexer 42. The incrementer 15 executes the rounding off process when receiving the control signal from the rounding off controller 14. Similarly, the output data of the incrementer 15 is normalized through the shifter 16, and output as data $D_3$ (step 2).

Thereafter, the above step 1 and step 2 are repeated three or four times, and thus the obtained data $X_{i+1}$, i.e., (i+1)th approximation data of 1/B is supplied to the multiplier 10 with the dividend data A, as input data $D_1$ and $D_2$. At this time, the signal DIV is set to L level and the exponent operation circuit and the sign operation circuit are enabled, and thus the result of the floating point division A/B is output as data $D_3$.

As mentioned above, the operation $(2-BX_i)$, where $0<BX_i \leq 1$, which is necessary in the division of the Newton-Raphson method, can be carried out by one step by adding "1" to the LSB of the $\overline{BX}_i$, i.e., an inversion of $BX_i$.

Accordingly, the repeating operation $X_{i+1}=X_i(2-BX_i)$ carried out when the reciprocal of the divisor (1/B) is obtained, is executed by two steps for one repeating operation, i.e., the first step is an operation of $(2-BX_i)$, and thus one step of the conventional three steps is omitted. The repeating operation is usually repeated three to four times, and the total operation time for the floating point division is considerably shortened.

Below, the operation of $(\frac{1}{2})*(3-A*X_i)$, which is used in the square root operation, is explained. Since the output $AX_i$ from the multiplier 10 is $0<AX_i \leq 1$, the data after passing through the shifter 13 becomes 1.0000 ... or 0.xxxx .... This data becomes 0.1111 ... from 1.0000 ... and 1.xxxx ... from 0.xxxx .... At this point, $\bar{x}$ is an inverted value of x, and when a partial operation in the square root operation, i.e., $(\frac{1}{2})*(3-A*X_i)$, is executed, the given control signal SQRT selects the output of the inventor 41 through the multiplexer 42. If the signal SQRT is not supplied, the output of the shifter 13 is supplied to the incrementer 15, and when the signal SQRT is supplied, "1" is added to the content of the incrementer 15 at the LSB thereof. The output of the incrementer 15 is made the mantissa output through the shifter 16. In the rounding off mode, the operation is the same as the division operation. In the incrementer 15, when the carry signal $F_2$ is "1", the signal $F_2$ is supplied to the multiplexer (MUXE) 24 in the exponent operation circuit, the outputs from the incrementers 22 and 23 are selected, and the output of the incrementer 15 is shifted by one bit to the right in the shifter 16. When the signal SQRT is supplied, the output of the incrementer 15 is also shifted.

Accordingly, at the output of the incrementer 15, the operation $(3-A*X_i)$ is executed and the output is divided by two by the shifter 16. As a result, the operation $(\frac{1}{2})*(3-AX_i)$ is executed by one step, where $0<AX_i \leq 1$.

Figure 4:
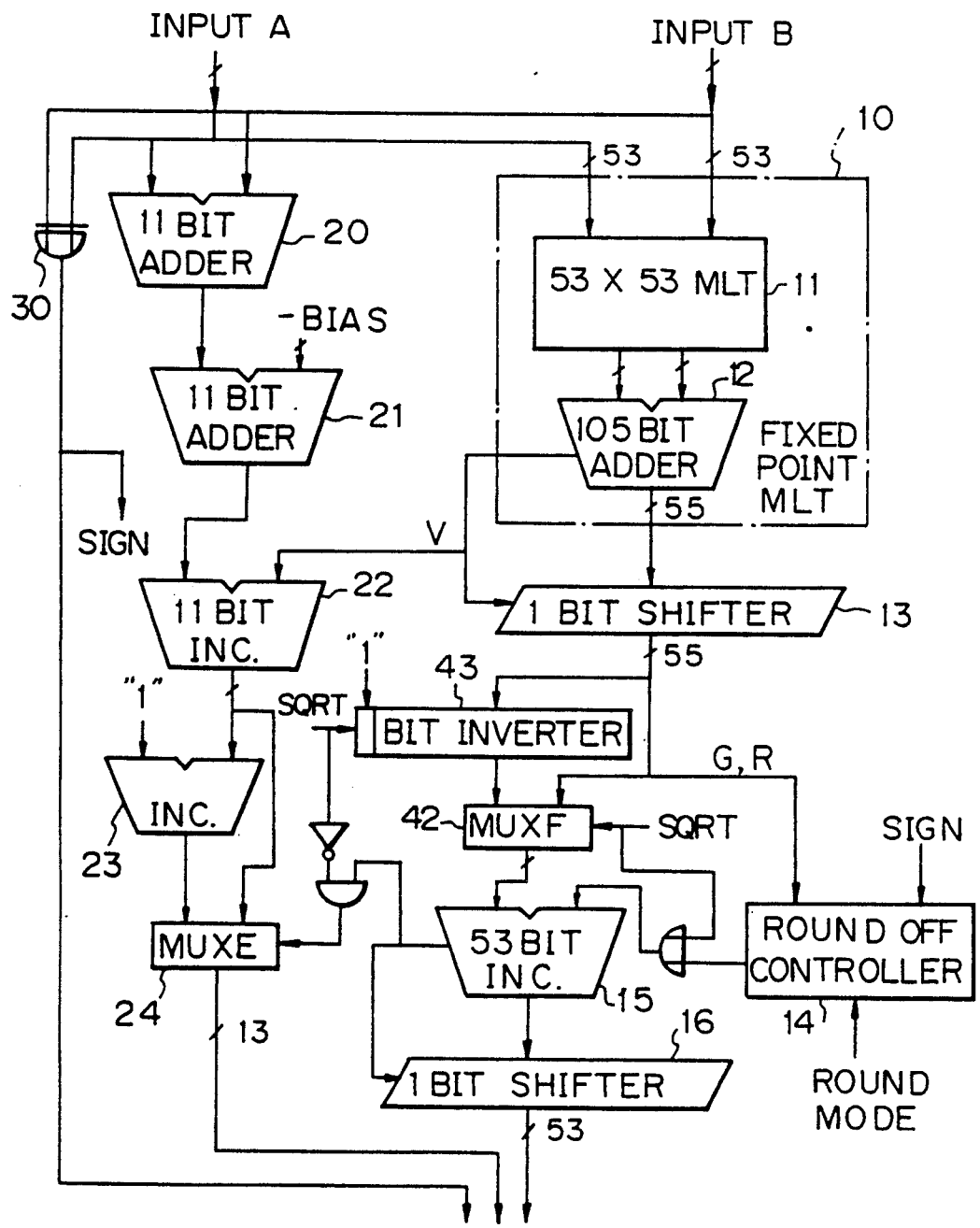
FIG. 4 is a circuit diagram showing a modification of the floating point operation unit of FIG. 3.

FIG. 4 shows a circuit diagram of a modification of the above embodiment. The exponent operation circuit and the sign operation circuit are the same as that of the above embodiment. This circuit performs the square root operation. The operation also comprises $B*X_i=A$, $(\frac{1}{2})*(3-A*X_i)$, and $X_i*(\frac{1}{2})*(3-A*X_i)$, and these operations are repeated.

The modified mantissa operation circuit comprises an inverter 43 instead of inverter 41, and the application of the control signal SQRT is different from that of the former embodiment. The remaining parts are similar to the corresponding portions in the above embodiment.

The output of the shifter 13 is supplied to the inverter 43 and the multiplexer 42. In the inverter 43, the input data below the point are inverted and the upper bits are set to "10"; namely the data "10.xxxx ... " is output.

Below, the processes of the operation $(\frac{1}{2})*(3-A*X_i)$ are explained. Since the output of the multiplier 10, $AX_i$ is in the state, $0 < AX_i \leq 1$, the overflow bit V is "0". The data through the shifter 13 is "1.0000 ... or 0.xxxx .... The data 1.0000 ... is made 10.1111 ... and the data 0.xxxx ... is made 10.$\bar{x}\bar{x}\bar{x}\bar{x}$ ... by the inverter 43. The term $\bar{x}$ is the inverted value of the term x. The multiplexer 42 selects the output of the inverter by the control signal SQRT supplied at a specific step of the square root operation, i.e., the operation of $(\frac{1}{2})*(3-A*X_i)$. If the signal SQRT is not supplied, the shifter 13 output is supplied to the incrementer 15. If the signal SQRT is supplied, a further "1" is added to the LSB in the incrementer 15. The output of the incrementer 15 is made the output of the mantissa portion through another shifter 16. In the rounding off mode, the rounding off controller receives the sign data and the data (G, R) from the shifter 13 and outputs the rounding off control signal. When the rounding off control signal is output, the incrementer 15 operates in the same way as when the signal SQRT is supplied. The explanation of the data (G, R), is abbreviated.

When the carry of the incrementer 15 is output and the signal SQRT is not supplied, the multiplexer 24 selects the output of the incrementer 22. The carry of the incrementer 15 shifts the data in the shifter 16 by one bit to the right. In the square root operation, since the overflow bit (i.e., figure of $2^1$) is "1", the shifter 16 shifts the data, and therefore, the signal SQRT is not supplied to the shifter 16.

As mentioned above, at the output of the incrementer 15, the operation $(3-A*X_i)$ is executed and the output is multiplied by $\frac{1}{2}$ by a one bit right shifting in the shifter 16, and thus the operation $(\frac{1}{2})*(3-AX_i)$ is executed with one step, where $0 < AX_i \leq 1$.

I claim:

1. A floating point operation unit comprising an exponent operation means for operating on exponents from two inputs to be processed, a sign operation means for operating on signs from the two inputs, and a mantissa operation means for operating on the respective mantissas of the two inputs, the mantissa operation means comprising:

fixed point multiplication means for receiving at least the respective mantissas of the two inputs and multiplying one of the mantissas by the other of the mantissas and producing a corresponding multiplied output and further producing a corresponding carry output in accordance with an overflow result of each such multiplication;

first right shift means for receiving the multiplication output of the fixed point multiplication means, and producing a normalized output, said first right shift means further receiving and being responsive to a carry output of said fixed point multiplication means for shifting the received multiplication output by one bit position for thereby producing the normalized output;

inverter means for receiving the normalized output of said first right shift means and producing a corresponding, inverted output;

rounding off control means for receiving the normalized output of said first right shift means and producing a rounding off control signal output;

means for supplying an iterative approximation control signal for each executed iterative approximation step of a division or square root processing operation;

incrementer means;

means for selectively supplying the inverted output of said inverter means to said incrementing means in response to the iterative approximation control signal and for supplying the normalized output of said first right shift means to said incrementer means in the absence of said iterative approximation control signal;

said incrementer means being responsive to receipt of the rounding off control signal for incrementing the normalized output of said first right shift means, when selectively supplied thereto, and producing a corresponding incremented output, being responsive to receipt of the iterative approximation control signal for incrementing the inverted output of said inverter means, when selectively supplied thereto, and producing a corresponding incremented output, and being responsive to an overflow therein for producing an incrementer carry output; and second right shift means for receiving said corresponding incremented outputs and, in response to either said incrementer carry output or the iterative approximation control signal corresponding to a square root operation, for shifting the received, corresponding incremented output and thereby producing a normalized mantissa output as the output of said mantissa operation means.

2. A floating point operation unit as recited in claim 1, wherein said fixed multiplication means comprises:

a partial products multiplier and addition circuit; and a further adder, said further adder producing said carry output supplied to said first right shift means and said first right shift means responding thereto to shift the multiplication output of said fixed point multiplication means by one bit to the right.

3. A floating point operation unit as recited in claim 1, wherein said selective supply means of said mantissa operation means comprises a multiplexer having first and second inputs connected to the corresponding outputs of said inverter and said first right shift means and selectively operable in response to said iterative approximation control signal for supplying the output of said inverter means to said incrementer means and, in the absence of said iterative approximation control signal, for supplying the normalized output of said first right shift means to said incrementer means.

4. A floating point operation unit comprising an exponent operation means for operating on exponents from two inputs to be processed, a sign operation means for operating on signs from the two inputs, and a mantissa operation means for operating on the respective mantissas of the two inputs, the mantissa operation means comprising:

fixed point multiplication means for receiving at least the respective mantissas of the two inputs and multiply one of the mantissas with the other of the mantissas and producing a corresponding multiplied output and a carry output in accordance with the results of the multiplication;

first right shift means for receiving the multiplication output of the fixed point multiplication means and producing a normalized output, said first right shift means further receiving and being responsive to a carry output of said fixed point multiplication means for shifting the received multiplication output by one bit position for thereby producing the normalized output;

inverter means for receiving the normalized output of said first right shift means and producing a corresponding, inverted output;

rounding off control means for receiving the normalized output of said first right shift means and producing a rounding off control signal output;

means for supplying an iterative approximation control signal for each executed iterative approximation step of a square root processing operation;

incrementer means;

means for selectively supplying the inverted output of said inverter means to said incrementing means in response to the iterative approximation control signal and for supplying the normalized output of said first right shift means to said incrementer means in the absence of said iterative approximation control signal;

said incrementer means being responsive to receipt of the rounding off control signal for incrementing the normalized output of said first right shift means, when selectively supplied thereto, and producing a corresponding incremented output, being responsive to receipt of the iterative approximation control signal for incrementing the inverted output of said inverter means, when selectively supplied thereto, and producing a corresponding incremented output, and being responsive to an overflow therein for producing an incrementer carry output; and second right shift means for receiving said corresponding incremented outputs and, in response to said incrementer carry output, for shifting the received, corresponding incremented output to the right and thereby producing a normalized mantissa output as the output of said mantissa operation means.

* * * * *

UNITED STATES PATENT AND TRADEMARK OFFICE
CERTIFICATE OF CORRECTION

PATENT NO. : 4,999,801

DATED : March 12, 1991

INVENTOR(S) : Akira KATSUNO

It is certified that error appears in the above-identified patent and that said Letters Patent is hereby corrected as shown below:

Title page,
item [57] Abstract, line 8, change "controler" to --controller--.

Col. 1, line 35, change "$1/\sqrt{}B$" to -- $1/\sqrt{B}$ --;

line 36, change "$\sqrt{}B$" to -- $\sqrt{B}$ --, and change "$1/\sqrt{}B$" to -- $1/\sqrt{B}$ --.

Col. 3, line 2, change "$C=\sqrt{}B$" to -- $C=\sqrt{B}$ --;

line 3, change "$C=B(1/\sqrt{}B)$" to -- $C=B(1/\sqrt{B})$ --;

line 9, change "$\sqrt{}B, X_i$" to -- $\sqrt{B}, X_i$ --;

line 12, change "$0<\sqrt{}3/B$" to -- $0<\sqrt{3/B}$ --;
line 46, change "operated" to --processed--.

Col. 4, line 28, change ""("MUKE")" to --"MUXE"--;

line 46, after "(30)" insert --,--.

Col. 5, line 7, change "("BITINV")" to --("BIT INV")--;

line 44, change "C: $C=\sqrt{}B=B(1\sqrt{}B)$" to -- $C:C=\sqrt{B}=B(1/\sqrt{B})$ --;

line 46, change "$0<X_0\leq\sqrt{}3/B$" to -- $0<X_0\leq\sqrt{3/B}$ --;

line 48, change "$\sqrt{}1/B$" to -- $\sqrt{1/B}$ --;
line 55, change "LSD" to --LSB--.

UNITED STATES PATENT AND TRADEMARK OFFICE
CERTIFICATE OF CORRECTION

PATENT NO. : 4,999,801
DATED : March 12, 1991
INVENTOR(S) : Akira KATSUNO

It is certified that error appears in the above-identified patent and that said Letters Patent is hereby corrected as shown below:

Col. 8,      line 23, after "and" insert --the second step is an operation of $X_i(2-BX_i)$, and--;
line 19, delete "X-"
line 20, delete "$_i(2-BX_i)$" and substitute --$X_i(2-BX_i)$--;

line 32, change "1.xxxx" to -- $1.\overline{xxxx}$ --.

Col. 9,      line 10, change "10.xxxx" to -- $10.\overline{xxxx}$ --.

Signed and Sealed this

Fifth Day of April, 1994

BRUCE LEHMAN

Attest:

Attesting Officer      Commissioner of Patents and Trademarks